United States Patent Office.

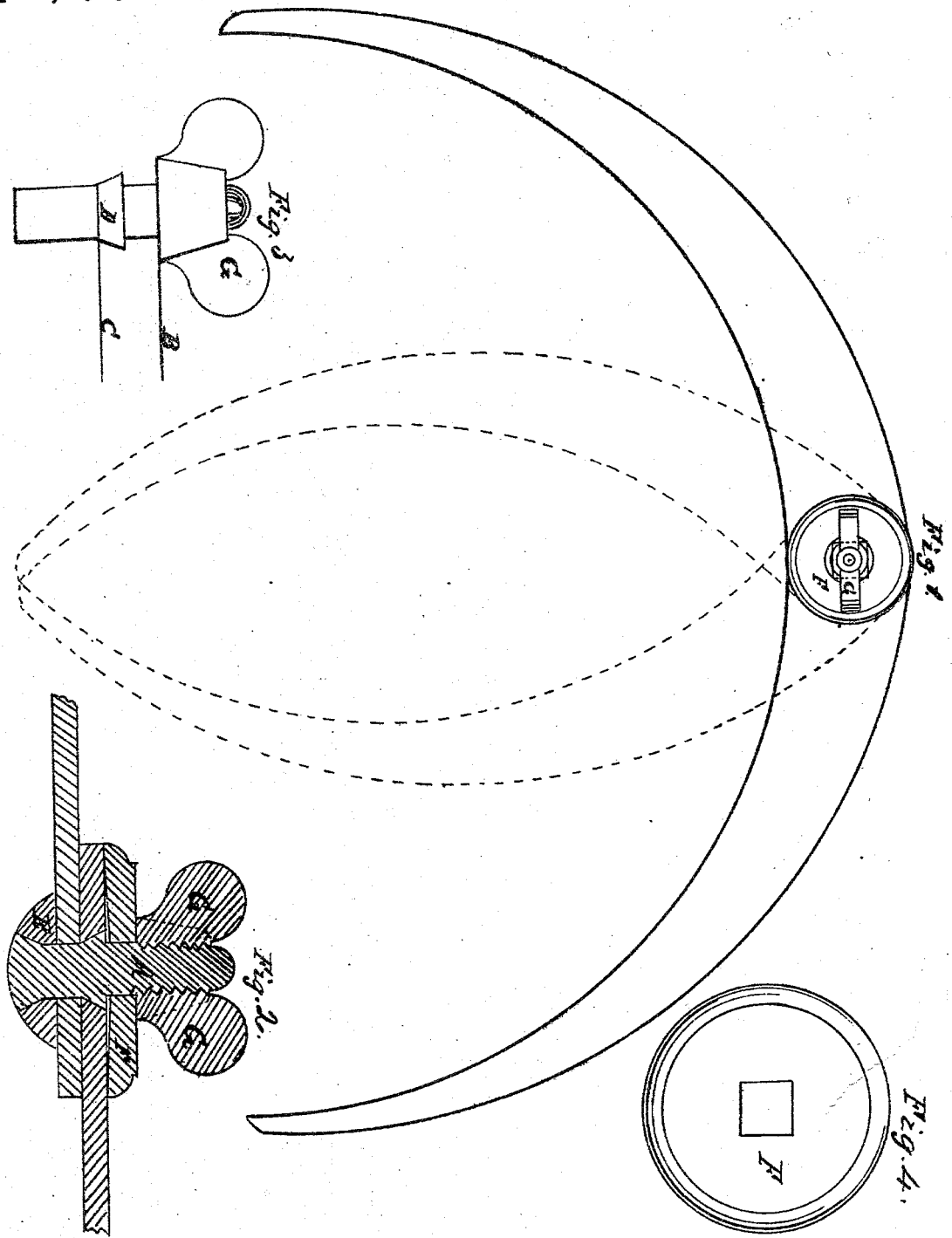

JEARUM ATKINS, OF WASHINGTON, DISTRICT OF COLUMBIA.

Letters Patent No. 75,827, dated March 24, 1868.

IMPROVEMENT IN CALIPERS.

*The Schedule referred to in these Letters Patent and making part of the same.*

TO ALL WHOM IT MAY CONCERN:

Be it known that I, JEARUM ATKINS, of Washington, in the District of Columbia, have invented a new and useful Improvement in Calipers; and I hereby declare the following to be a full and exact description of the same, reference being had to the drawings that accompany and form a part of these specifications.

The nature of my invention consists in the use of a combined screw and rivet for fastening and clamping the calipers in any desired position, whereby a very neat, cheap, and efficient instrument is obtained.

Figure 1 is a side view of the calipers complete.

Figure 2, a section at right angles with fig. 1, taken on the plane of the centre of the screw.

Figure 3 shows the screw as it is formed before riveting, with the nut G attached.

Figure 4, a washer, to be placed between the nut and the upper leg of the calipers.

I construct my calipers in the usual form, except in the manner of fastening and clamping the same, which is effected by means of the combined rivet and screw A. This rivet is square between the lines B and C, fig. 3, and enlarged at D. This enlargement acts conjointly with the lower head, E, in fastening the two legs of the calipers together. A washer, F, is placed around the screw, over the upper leg of the calipers, to receive the pressure of the nut G. That portion of the screw contained within the washer F is square, (the hole in the washer being made to fit) to prevent the latter from turning round as the screw is tightened for clamping the calipers, and holding them firmly in any position which may be desirable. The under side of the washer F is slightly concave, so that only its outer edge shall bear upon the upper leg of the calipers, and does not rest upon the shoulder upon the screw just beneath it when the nut is tightened.

The advantage claimed for this invention is as follows: The rivet can be tightened to any degree that may be desirable, leaving the calipers so that they may be easily set to any-sized work. Then, when they are once set, the nut can be tightened up for clamping the calipers and holding them firmly, so that there may be no danger of their being accidentally changed while being used.

Having thus described my invention, I desire to state that I do not claim as new the fastening of calipers by means of a rivet, neither do I claim as new clamping the same by means of a screw and nut.

What I claim as my invention, and desire to secure by Letters Patent, is—

The within-described arrangement for fastening and clamping calipers, of the combined rivet and screw A, with its nut G and washer F, substantially as described.

In testimony whereof, I have signed my name to this specification in the presence of two subscribing witnesses.

JEARUM ATKINS,

Witnesses:
 DANIEL D. ROBINSON,
 DAVID M. VAN NARABSTRAN.